US011239913B1

(12) United States Patent
Aljohani et al.

(10) Patent No.: US 11,239,913 B1
(45) Date of Patent: Feb. 1, 2022

(54) METHOD FOR REGENERATING OPTICAL SIGNALS OVER FREE SPACE OPTICAL LINKS

(71) Applicant: King Abdulaziz University, Jeddah (SA)

(72) Inventors: Abdulah Aljohani, Jeddah (SA); Salman Ghafoor, Jeddah (SA); Jawad Mirza, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/345,509

(22) Filed: Jun. 11, 2021

(51) Int. Cl.
 *H04B 10/00* (2013.01)
 *H04B 10/11* (2013.01)
 *H04B 10/29* (2013.01)

(52) U.S. Cl.
 CPC .............. *H04B 10/11* (2013.01); *H04B 10/29* (2013.01)

(58) Field of Classification Search
 CPC ... H04B 10/11; H04B 10/112; H04B 10/1123; H04B 10/1129; H04B 10/29; H04B 10/291; H04B 10/114; H04B 10/1143; H04B 10/1149; H04B 10/116; H04B 10/118; H04B 10/40; H04B 10/2507
 USPC ....... 398/118, 119, 124, 126, 127, 128, 129, 398/130, 131, 135, 136, 158, 159, 173, 398/175, 176, 120, 121, 125
 See application file for complete search history.

(56) References Cited

U.S. PATENT DOCUMENTS

| 6,348,986 B1* | 2/2002 | Doucet .............. H04B 10/1121 398/128 |
| 10,340,658 B1 | 7/2019 | Boyd et al. | |
| 2011/0116805 A1* | 5/2011 | Xia ........................ H04B 10/11 398/131 |
| 2016/0119059 A1* | 4/2016 | Chandra ............ H04B 10/1129 398/126 |

FOREIGN PATENT DOCUMENTS

JP       2004361789 A    12/2004

OTHER PUBLICATIONS

Abdulah Jeza Aljohani et al.; "A novel regeneration technique for free space optical communication systems", IEEE Communications Letters (vol. 25, Issue: 1), Oct. 8, 2020.

* cited by examiner

*Primary Examiner* — Hanh Phan
(74) *Attorney, Agent, or Firm* — Oblon, McClelland, Maier & Neustadt, L.L.P.

(57) ABSTRACT

A method and system for regenerating free space optical (FSO) signal pulses over free space optical (FSO) links. The FSO signal pulses are received over a first FSO link by a receiver telescope. The FSO signal pulses are split into a first part and a second part. The first part of the FSO signal pulses is converted to an electrical signal. The electrical signal is low pass filtered, amplified, and inverted to generate a negative electric voltage. The amplitude of the second part of the FSO signal pulses is attenuated by an optical absorber based on the negative electric voltage, thus regenerating the FSO signal pulses. The regenerated FSO signal pulses are amplified and bandpass filtered. The amplified and filtered regenerated FSO signal pulses are transmitted on a second FSO link.

20 Claims, 7 Drawing Sheets

METHOD FOR REGENERATING OPTICAL SIGNALS OVER FREE SPACE OPTICAL LINKS

STATEMENT REGARDING PRIOR DISCLOSURE BY THE INVENTORS

Aspects of this technology are described in an article titled: "A novel regeneration technique for free space optical communication systems" published in IEEE Communications Letters, Vol. 25, Issue 1 on Oct. 8, 2020, which is incorporated herein by reference in its entirety.

BACKGROUND

Technical Field

The present disclosure is directed to a free space optical (FSO) communication system and regenerating optical signals in the FSO communication system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Free-space optical (FSO) communication is an optical-wireless communication technique that uses light pulses to wirelessly transmit data from a transmitter to a receiver telescope(s). The transmitter telescope transmits data in a form of optical signal as optical pulses towards the receiver telescope over free space optical (FSO) link. Using FSO communication architectures, FSO links operating at very high data rates may be achieved, providing a suitable alternative to fiber-based last-mile access links and having advantages such as high data rates, license-free spectrum, immunity to electromagnetic interference, and low installation and maintenance costs. There may be situations where a length of the FSO link is large or there is an obstruction in the line of sight path between the transmitter and receiver telescopes in terrains such as in metropolitan cities that are congested due to tall buildings and towers. Further, various factors, such as atmospheric attenuation and turbulence-induced fading, geometrical losses, and pointing and tracking errors, may limit the reliability of the FSO link, resulting in poor bit error rate (BER) performance and reduced range of transmission of the FSO link.

When an optical signal is transmitted from the transmitter telescope to the receiver telescope over the FSO link, the optical signal may be distorted due to various impairments induced by the FSO link. The data transmitted over the FSO link is digital and the optical signal comprising optical pulses is used to transmit the data. As a result, the primary distortions induced over the optical pulses are intensity fluctuations that are random, and their magnitude is higher for longer lengths of the FSO link.

To extend the transmission range of FSO links while maintaining error-free transmission, relay-assisted transmission schemes may be used. The relay-assisted transmission schemes may use one or more relay nodes between the transmitter and receiver telescopes. The relay-assisted transmission schemes may employ all-optical relay nodes that operate in the optical domain with no optical to electrical and electrical to optical conversions. Further, the relay-assisted transmission schemes may employ all-optical amplify and forward (AOAF) based relay nodes that amplify and forward the optical signal at one or more intermediate points (or the relay nodes) between the transmitting and receiving telescopes. The relay-assisted transmission schemes may reduce transmission power required by the transmitter telescope due to the presence of an intermediate amplification stage.

However, the AOAF based relay nodes can only amplify the distorted optical signal and forward the amplified distorted optical signal to the receiver telescope. Therefore, there is a need to regenerate the optical signal at the relay node so that the distortion (or the intensity fluctuations) in the optical signal can be reduced. To regenerate the optical signal, the relay-assisted transmission schemes may employ all-optical regenerate and forward (AORF) based relay nodes that regenerate and forward the optical signals between the transmitting and receiving telescopes. The AORF based relay nodes may use an optical regenerator to regenerate the optical signal by re-amplifying and reshaping the distorted optical signal. However, optical regenerators that are currently known require high nonlinear effects, thus, making them cost-inefficient for use.

Various solutions have been developed in recent years to extend the transmission range of FSO links while maintaining error-free transmission. An optical waveform shaping apparatus in an optical transmission system to increase the amount of optical absorption to compress low level optical intensity while increasing the amount of optical absorption used an absorption layer of a multiquantum well structure to compress high level optical intensity. (See: JP2004361789A, "Optical Pulse Shaping Device And Optical Transmission System", incorporated herein by reference in its entirety). Further, a laser system for atomic clocks and sensors, having a modulator arranged in the optical path to generate a frequency-shifted sideband from laser light and a feedback-based lock controller to lock optical frequency of frequency-shifted sideband to a re-pumping transition for atom cooling was described (See: U.S. Ser. No. 10/340, 658B1, "Laser system for atomic clocks and sensors", incorporated herein by reference in its entirety). Further, a switchable technique for hybrid RF-FSO system employing decode-and-forward relay is proposed in which the transmitter sends the information signal over FSO or RF links when the instantaneous signal-to-noise ratio (SNR) at the FSO receiver is greater or lower than the threshold SNR, respectively was described. (See: S. Sharma, A. S. Madhukumar, and R. Swaminathan; "Switching-based cooperative decode-and-forward relaying for hybrid FSO/RF networks," Journal of Optical Communications and Networking, vol. 11, no. 6, pp. 267-281, 2019, incorporated herein by reference in its entirety). The performance analysis of a dual-hop all-optical amplify and forward FSO relaying scheme based on a few-mode EDFA for atmospheric turbulent channels was described. (See: S. Cai, Z. Zhang, and X. Chen; "Turbulence-Resistant All Optical Relaying Based on FewMode EDFA in Free-Space Optical Systems," Journal of Lightwave Technology, vol. 37, no. 9, pp. 2042-2049, 2019, incorporated herein by reference in its entirety). An experimental investigation of relay based optical link in which optical signals at the rate of 10 Gbps are transmitted over a turbulent channel, and the relay performs simple optical amplification instead of regeneration was described. (See: N. A. M. Nor, Z. F. Ghassemlooy, J. Bohata, P. Saxena, M. Komanec, S. Zvanovec, M. R. Bhatnagar, and M.-A. Khalighi; "Experimental investigation of all-optical relay-assisted 10 gb/s FSO link over the atmospheric turbulence channel," Journal of Lightwave Technology, vol. 35, no. 1, pp. 45-53, 2017, incorporated herein by reference in its entirety).

Each of the aforementioned references suffers from one or more drawbacks, such as failing to suppress intensity variations of the optical pulses in the optical signal and requiring excessive operating power due to strong absorption of input light, thus hindering their adoption.

Accordingly, it is one object of the present disclosure to provide methods and systems for regenerating optical signals to suppress intensity variations of the optical pulses used to transmit and/or receive data over the FSO link and provide an optical regenerator that is cost efficient, has a simple working principle, and can be easily integrated into the existing FSO communication system without any change to the existing components of the FSO communication system.

SUMMARY

In an exemplary embodiment, a method for all-optical regeneration of optical pulsed signals in free space optical communications is disclosed. The method includes receiving, by a first receiver telescope, free space optical (FSO) signal pulses from a first free space optical (FSO) link; splitting, by an optical splitter, the FSO signal pulses into a first path receiving 5% of the FSO signal pulses and a second path receiving 95% of the FSO signal pulses; converting, by a first photodetector, $PD_1$, the 5% of the FSO signal pulses to a first electrical signal; low pass filtering the first electrical signal, by a first electrical low pass filter, $ELPF_1$, to remove harmonics; generating a negative polarity, amplified voltage signal, by an inverting electrical amplifier, EA, from the low pass filtered first electrical signal; attenuating the amplitude of the 95% of the FSO signal pulses based on the negative polarity, amplified voltage signal, by an electro-absorption modulator, EAM; amplifying, by a first optical amplifier, $OA_1$, the attenuated 95% of the FSO signal pulses; band pass filtering, by a first optical band pass filter, $OBPF_1$, the amplified 95% of the FSO signal pulses to generate output FSO signal pulses; and transmitting, by a first transmitter telescope, the output FSO signal pulses on a second free space optical (FSO) link.

In another exemplary embodiment, a free space optical (FSO) communication system is disclosed. The FSO communication system includes a relay node. The relay node includes a first receiver telescope, an optical regenerator, and a first transmitter telescope. The first receiver telescope is configured to receive free space optical (FSO) signal pulses on a first free space optical (FSO) link. The optical regenerator includes an optical splitter configured to split the FSO signal pulses into a first path receiving 5% of the FSO signal pulses and a second path receiving 95% of the FSO signal pulses; a first photodetector, $PD_1$, located on the first path, the first photodetector configured to convert the 5% of the FSO signal pulses to a first electrical signal; a first electrical low pass filter, $ELPF_1$, connected to the photodetector, the first electrical low pass filter configured to remove harmonics from the first electrical signal; an inverting electrical amplifier, EA, connected to the first electrical low pass filter and configured to generate a negative polarity, amplified voltage signal from the first electrical signal; an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal; a first optical amplifier, $OA_1$, connected to an optical output of the electro-absorption modulator and configured to amplify the attenuated 95% of the FSO signal pulses; and a first optical band pass filter, $OBPF_1$, connected to the first optical amplifier and configured to filter the frequency of the amplified 95% of the FSO signal pulses and generate output FSO signal pulses. The first transmitter telescope is configured to transmit the output FSO signal pulses on a second free space optical (FSO) link.

In another exemplary embodiment, a system for optical regeneration of optical communications is disclosed. The system for optical regeneration of optical communications includes a first transmitter, a relay node, and a second receiver telescope. The first transmitter is configured to transmit free space optical (FSO) signal pulses on a first free space optical (FSO) link. The relay node includes a first receiver telescope configured to receive the FSO signal pulses; an optical splitter configured to split the FSO signal pulses into a first path receiving 5% of the FSO signal pulses and a second path receiving 95% of the FSO signal pulses; a first photodetector, $PD_1$, located on the first path, the first photodetector configured to convert the 5% of the FSO signal pulses to a first electrical signal; a first electrical low pass filter, $ELPF_1$, connected to the photodetector, the first electrical low pass filter configured to remove harmonics from the first electrical signal; an inverting electrical amplifier, EA, connected to the first electrical low pass filter and configured to generate a negative polarity, amplified voltage signal from the first electrical signal; an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal; a first optical amplifier, $OA_1$, connected to an optical output of the electro-absorption modulator and configured to amplify the attenuated 95% of the FSO signal pulses; a first optical band pass filter, $OBPF_1$, connected to the first optical amplifier and configured to filter the frequency of the amplified 95% of the FSO signal pulses and generate output FSO signal pulses; and a second transmitter telescope configured to transmit the output FSO signal pulses on a second free space optical (FSO) link. The second receiver telescope is configured to receive the output FSO signal pulses on the second FSO link.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
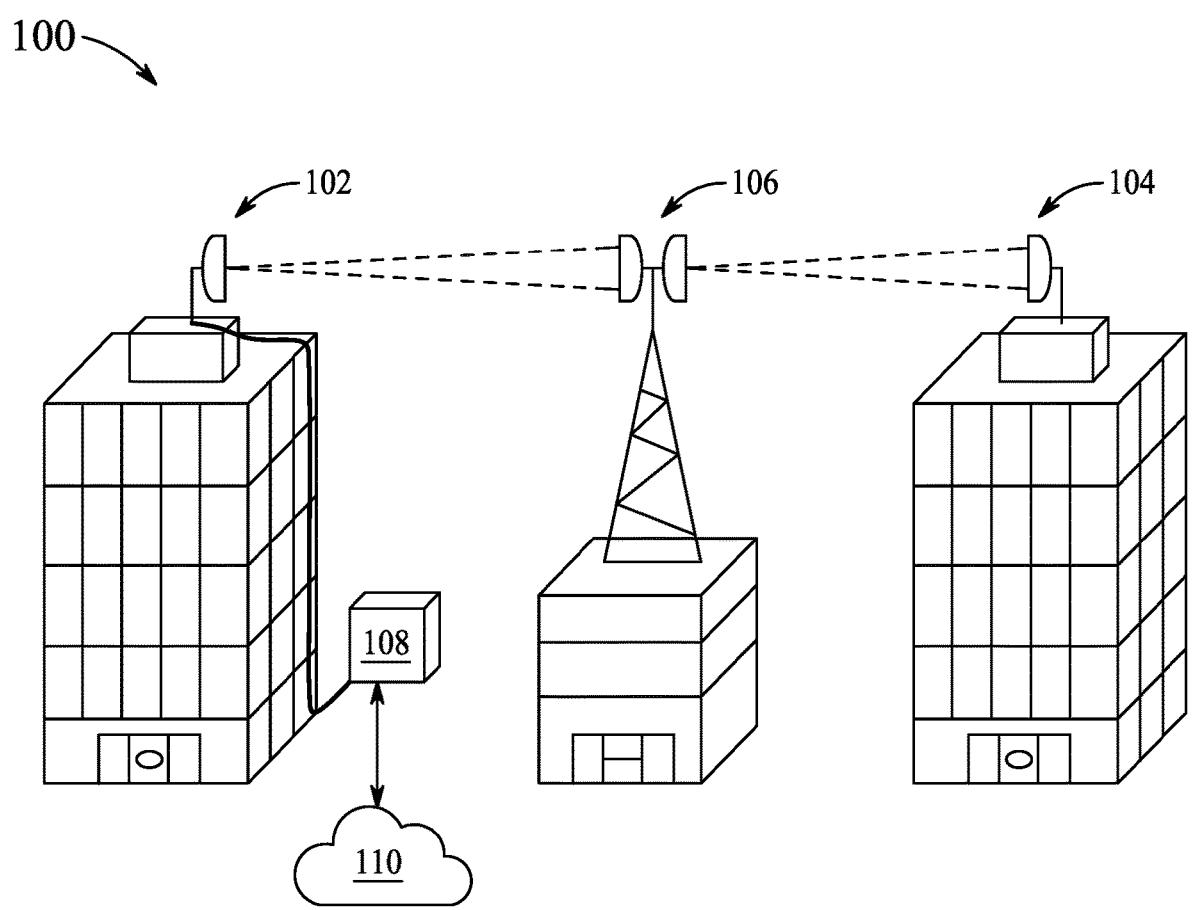
FIG. 1 is a network architecture of a relay-assisted free space optical (FSO) communication system, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for regenerating free space optical (FSO) signal pulses over free space optical (FSO) link. The present disclosure splits FSO signal pulses received over a first FSO link into a first part and a second part. The present disclosure converts the first part of the FSO signal pulses to an electrical signal and attenuates the second part of the FSO signal pulses based on the electrical signal. The attenuated second part of the FSO signal pulses is regenerated and transmitted over a second FSO link.

FIG. 1 depicts a network architecture of a relay-assisted free space optical (FSO) communication system 100, according to exemplary aspects of the present disclosure.

According to aspects of the present disclosure, the relay-assisted free space optical communication system 100 may include a FSO transmitter telescope 102, a FSO receiver telescope 104, a relay node 106, a control unit 108, and a network 110. The FSO transmitter telescope 102, the FSO receiver telescope 104, and the relay node 106 may be installed on various structures, such as rooftops of buildings and towers.

In some aspects of the present disclosure, the FSO transmitter telescope 102 may receive information to be transmitted to the FSO receiver telescope 104 from the control unit 108. The control unit 108 may receive the information via the network 110. The information to be transmitted may be received by the FSO transmitter telescope 102 in the form of electrical signal or optical signal. In some aspects of the present disclosure, the FSO transmitter telescope 102 may include hardware and/or software modules required to convert the electrical signal to the FSO signal pulses for transmission. The FSO transmitter telescope 102 may transmit the information in the form of the FSO signal pulses over a FSO link.

In some aspects of the present disclosure, the FSO link may refer to a surrounding atmosphere between the FSO transmitter telescope 102 and the FSO receiver telescope 104. Quality of the FSO link and range of the FSO transmitter telescope 102 may depend on various factors, such as, atmospheric attenuation, turbulence-induced fading, geometrical losses, and pointing and tracking errors. Such factors may limit the reliability of the FSO link, resulting in poor bit error rate (BER) performance and reduced range of transmission.

To overcome the poor bit error rate (BER) performance and reduced range of transmission, the relay node 106 may be provided between the FSO transmitter telescope 102 and the FSO receiver telescope 104. The relay node 106 may receive the FSO signal pulses transmitted from the FSO transmitter telescope 102, regenerate and/or amplify the received FSO signal pulses, and forward the regenerated and/or amplified FSO signal pulses to the FSO receiver telescope 104. The relay node 106 may include a receiving telescope and a transmitting telescope to receive the FSO signal pulses from the FSO transmitter telescope 102 and forward the regenerated and/or amplified FSO signal pulses to the FSO receiver telescope 104, respectively. The relay node is explained with respect to FIG. 2 and FIG. 3 below. The relay node 106 may further include hardware and/or software modules required for regeneration and/or amplification of the FSO signal pulses.

In an aspect of the present disclosure, the relay node 106 may amplify the received FSO signal pulses and forward the amplified FSO signal pulses to the FSO receiver telescope 104.

In another aspect of the present disclosure, the relay node 106 may regenerate the received FSO signal pulses. The information transmitted over the FSO link may be digital and the FSO signal pulses comprising optical pulses may be used to transmit the information. The optical pulses in the FSO signal pulses may be distorted due to various impairments induced by the FSO link. Major distortion in the optical pulses may be intensity variations, that are random, and their magnitude increases with an increase in the length of the FSO link. The relay node 106 may regenerate the FSO signal pulses by suppressing intensity variations in the optical pulses. The relay node 106 may forward the regenerated FSO signal pulses to the FSO receiver telescope 104.

In some aspects of the present disclosure, the communication between the FSO transmitter telescope 102 and the FSO receiver telescope 104 may be bi-directional communication. For bi-directional communication, both, the FSO transmitter telescope 102 and the FSO receiver telescope 104 may transmit and receive FSO signal pulses.

In some aspects of the present disclosure, the network 110 may be a wireless network, a wired network (a user device connected to an internet device in an automobile through wires), or a combination thereof. The network 110 may also be an individual network or a collection of many such individual networks, interconnected with each other and functioning as a single large network, e.g., the Internet or an intranet. The network 110 may be implemented as one of the different types of networks, such as intranet, local area network (LAN), wide area network (WAN), the internet, and the like. The network 110 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 110 may include a variety of network devices, including routers, bridges, servers, computing devices, storage devices, and the like.

Figure 2:
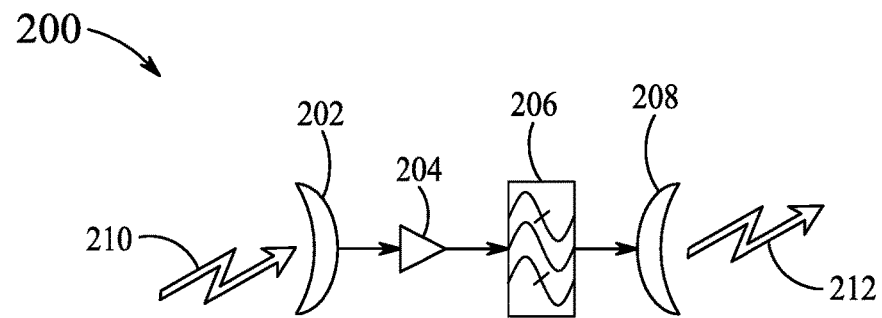
FIG. 2 is an overview of an all optical amplify and forward (AOAF) based relay node, according to exemplary aspects of the present disclosure.

FIG. 2 depicts a schematic diagram of an overview of an all optical amplify and forward (AOAF) based relay node 200, according to exemplary aspects of the present disclosure.

According to aspects of the present disclosure, the AOAF based relay node 200 may include a receiver telescope 202, an optical amplifier (OA) 204, an optical band pass filter (OBPF) 206, and a transmitter telescope 208. Output of the receiver telescope 202 may be connected to the OA 204, output of the OA 204 may be connected to the OBPF 206, and output of the OBPF 206 may be connected to the transmitter telescope 208.

In some aspects of the present disclosure, the AOAF based relay node 200 may correspond to the relay node 106 of FIG. 1. The receiver telescope 202 may receive the FSO signal pulses from the FSO transmitter telescope 102 over a first FSO link 210. The receiver telescope 202 may output the received FSO signal pulses to the OA 204. The OA 204 may amplify the received FSO signal pulses and output the amplified FSO signal pulses to the OBPF 206. The OBPF 206 may remove out-of-band amplified spontaneous emission (ASE) noise from the amplified FSO signal pulses. The OBPF 206 may output the amplified FSO signal pulses to the transmitter telescope 208. The transmitter telescope 208 may forward the amplified FSO signal pulses to the FSO receiver telescope 104 over a second FSO link 212.

The FSO signal pulses received at the receiver telescope 202 may be distorted due to various impairments induced by the first FSO link 210. However, as discussed herein, a conventional AOAF based relay node 200 simply amplifies the FSO signal pulses received from the FSO transmitter telescope 102 over the first FSO link 210 and forwards the amplified FSO signal pulses to the FSO receiver telescope 104. Thus, the AOAF based relay node 200 may only amplify the distorted FSO signal pulses. Simply amplifying the distorted FSO signal pulses may result in poor bit error rate (BER) performance and reduced range of transmission. In aspects of the present disclosure, the FSO signal pulses are regenerated to eliminate distortions and then amplified to achieve better BER performance and increased range of transmission.

Figure 3:
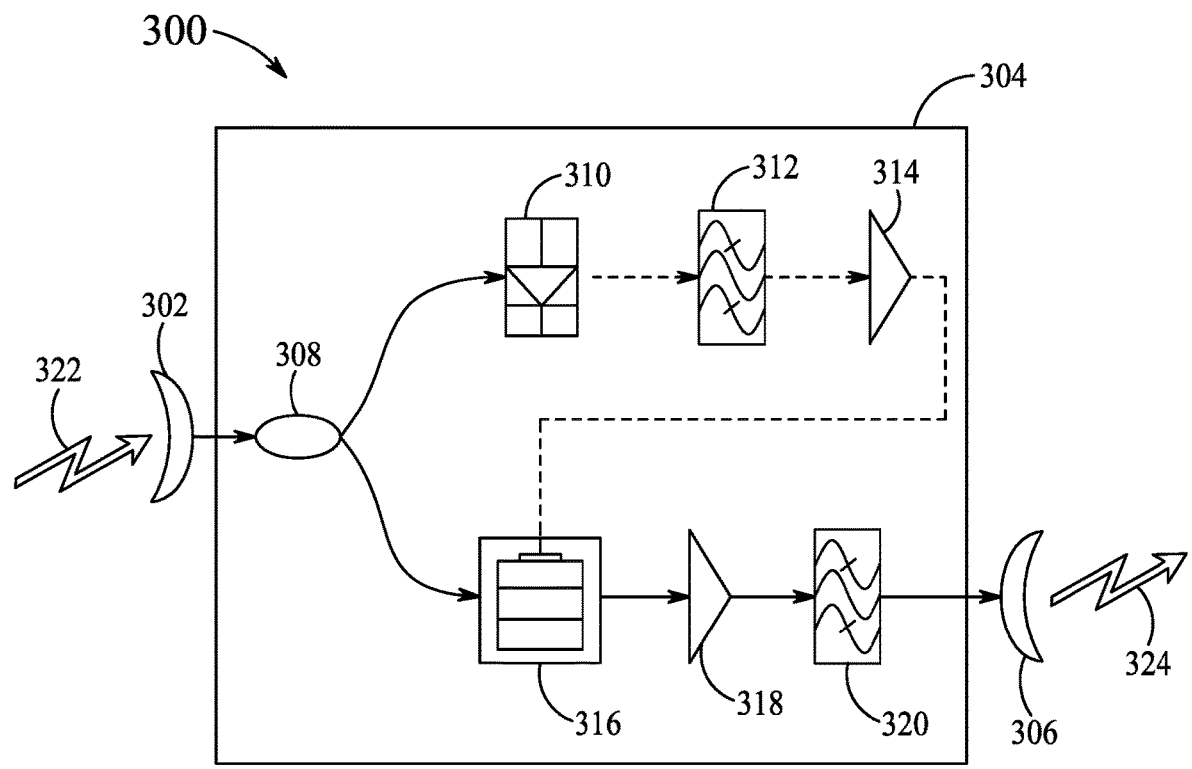
FIG. 3 is a schematic diagram of an all optical regenerate and forward (AORF) based relay node, according to exemplary aspects of the present disclosure.

FIG. 3 depicts a schematic diagram of an all optical regenerate and forward (AORF) based relay node 300, according to exemplary aspects of the present disclosure.

According to aspects of the present disclosure, the AORF based relay node 300 may include a receiver telescope 302, an optical regenerator 304, and a transmitter telescope 306. The optical regenerator 304 may include an optical splitter 308, a photodetector 310, an electrical low pass filter (ELPF) 312, an inverting electrical amplifier (EA) 314, an electro-absorption modulator (EAM) 316, an optical amplifier (OA) 318, and an optical band pass filter (OBPF) 320. Output of the receiver telescope 302 may be connected to the optical splitter 308. A first optical output of the optical splitter 308 may be connected to the photodetector 310 and a second optical output of the optical splitter 308 may be connected to the EAM 316. The output of the photodetector 310 may be connected to the ELPF 312 and the output of the ELPF 312 may be connected to the inverting EA 314. Output of the inverting EA 314 may be connected to an electrical input of the EAM 316. Output of the EAM 316 may be connected to the OA 318, and output of the OA 318 may be connected to the OBPF 320, and output of the OBPF 320 may be connected to the transmitter telescope 306.

In some aspects of the present disclosure, the AORF based relay node 300 may correspond to the relay node 106 of FIG. 1. The receiver telescope 302 may receive the FSO signal pulses from the FSO transmitter telescope 102 over a first FSO link 322. The receiver telescope 302 may output the received FSO signal pulses to the optical splitter 308. The optical splitter 308 may split the FSO signal pulses into a first path and a second path. The first path may receive a first part of the FSO signal pulses and the second path may receive a second part of the FSO signal pulses. In an aspect of the present disclosure, the second part of the FSO signal pulses is greater than the first part of the FSO signal pulses. In an example, an optical power of the first part of the FSO signal pulses is 5% and optical power of the second part of the FSO signal pulses is 95% of total optical power of the FSO signal pulses. In another example, an optical power of the first part of the FSO signal pulses is greater than 1% and less than or equal to 10% and an optical power of the second part of the FSO signal pulses is greater than or equal to 90% of the total optical power of the FSO signal pulses.

The optical splitter 308 may output the first part of the FSO signal pulses to the photodetector 310 on the first path. The photodetector 310 may convert the first part of the FSO signal pulses to an electrical signal. The photodetector 310 may output the electrical signal to the ELPF 312. The electrical signal is low pass filtered by the ELPF 312. The ELPF 312 may filter the electrical signal to remove harmonics from the electrical signal. The ELPF 312 may output the filtered electrical signal to the inverting EA 314. The inverting EA 314 may generate a negative polarity electrical signal and amplify the negative polarity electrical signal. The inverting EA 314 may output the amplified negative polarity electrical signal to an electrical input of the EAM 316. The amplified negative polarity electrical signal may be used as a negative electric voltage applied at the electrical input of the EAM 316. Further, the optical splitter 308 may output the second part of the FSO signal pulses on the second path to an optical input of the EAM 316. Thus, the EAM 316 receives the second part of the FSO signal pulses at the optical input and the negative electric voltage at the electrical input.

According to some aspects of the present disclosure, the EAM 316 may regenerate the FSO signal pulses instead of simply amplifying the FSO signal pulses received over the first FSO link 322. The first FSO link 322 may induce impairments in the optical pulses of the FSO signal pulses, resulting in intensity variations in the optical pulses of the FSO signal pulses. The EAM 316 may regenerate the FSO signal pulses by suppressing intensity variations in the optical pulses of the FSO signal pulses.

In some aspects of the present disclosure, the EAM 316 may be a semiconductor device for modulating intensity of the FSO signal pulses using electric voltage. The principle of operation of the EAM 316 may be based on Franz-Keldysh effect, i.e., a change in absorption spectrum caused by an applied electric field changes the bandgap energy. The EAM 316 may be realized using one or more semiconductor materials whose effective bandgap decreases when the electric voltage is applied to its terminals. Reduction in the bandgap of the semiconductor material may result in absorption of the FSO signal pulses, thus, increasing the attenuation of the EAM 316. In the absence of applied electric voltage, the EAM 316 may have minimum attenuation. This is because the bandgap of the semiconductor material may be larger than the energy of incoming photons in the FSO signal pulses, resulting in the EAM 316 being almost transparent. As the magnitude of the applied electric voltage is increased, the bandgap may decrease and the attenuation of the semiconductor material may increase, resulting in absorption of the FSO signal pulses. Therefore, the attenuation induced by the EAM 316 may vary in accordance with the variations in the levels of applied electric voltage. This principle may be used to suppress the intensity variations in the optical pulses of the FSO signal pulses.

A relationship between the applied electric voltage and the attenuation is further described with reference to FIG. 4, which depicts the attenuation versus applied electric voltage curve for the EAM 316. In an aspect of the present disclosure, the applied electric voltage may have negative polarity.

In an aspect of the present disclosure, the EAM 316 is realized using one or more bulk semiconductor materials. The bulk semiconductor materials may include, for example, Indium phosphide (InP), Gallium arsenide (GaAs), and Indium gallium arsenide phosphide (InGaAsP). The EAM 316 may be in the form of an optical waveguide having electrodes for applying the negative electric voltage in a direction perpendicular to the second part of the FSO signal pulses received at the optical input of the EAM 316. The optical waveguide may have an intrinsic depletion region between a p-type semiconductor and an n-type semiconductor. The electrical input of the EAM 316 may be connected to the p-type semiconductor and the n-type semiconductor may be grounded. The negative electric voltage may be applied at the electric input of the EAM 316, perpendicularly across the intrinsic depletion region with respect to a direction of the second part of the FSO signal pulses on the second path. A bandgap of the intrinsic depletion region may increase or decrease based on an amplitude of the negative electric voltage. Increase or decrease in the bandgap of the intrinsic depletion region may result in attenuating intensity variations of the second part of the FSO signal pulses. In an aspect of the present disclosure, the bandgap of the intrinsic depletion region may increase with increase in the amplitude of the negative electric voltage, resulting in increasing the attenuation of the intensity variations of the second part of the FSO signal pulses. In an aspect of the present disclosure, the bandgap of the intrinsic depletion region may decrease with decrease in the amplitude of the negative electric voltage, resulting in decreasing the attenuation of the intensity variations of the second part of the FSO signal pulses.

In operation, the optical input of the EAM 316 receives the second part of the FSO signal pulses from the optical splitter 308 on the second path and the electrical input of the EAM 316 receives the negative electric voltage (or the applied electric voltage) from the inverting EA 314. The EAM 316 operates on the basis of above-explained principle to suppress the intensity variations in the optical pulses of the second part of the FSO signal pulses. In an aspect of the present disclosure, the inverting EA 314 may include a gain control function. The gain control function may be used to adjust gain of the inverting EA 314. By adjusting the gain of the inverting EA 314, the amplitude of the negative electric voltage may be adjusted. The gain of the inverting EA 314 may be suitably adjusted to adjust the minimum and maximum values of the negative electric voltage along an approximately linear region of the attenuation vs. the applied electric voltage curve. The optical pulses, in the second part of the FSO signal pulses, having higher intensities are attenuated more relative to optical pulses having lower intensities. This results in suppressing the intensity variations of the optical pulses obtained at the output of the EAM 316. Thus, the FSO signal pulses at the output of the EAM 316 are regenerated FSO signal pulses having suppressed intensity variations.

The EAM 316 may output the regenerated FSO signal pulses to the OA 318. The OA 318 may amplify the regenerated FSO signal pulses and output the amplified version of the regenerated FSO signal pulses to the OBPF 320. The OBPF 320 may bandpass filter the regenerated FSO signal pulses. In an aspect of the present disclosure, the OBPF 320 may remove out-of-band amplified spontaneous emission (ASE) noise from the regenerated FSO signal pulses. The OBPF 320 may output the regenerated FSO signal pulses to the transmitter telescope 306. The transmitter telescope 306 may forward the regenerated FSO signal pulses to the FSO receiver telescope 104 over a second FSO link 324.

As discussed herein, the optical regenerator 304 of the AORF based relay node 300 regenerates the FSO signal pulses to suppress the intensity variations of the optical pulses. The AORF based relay node 300 forwards the regenerated FSO signal pulses to the FSO receiver telescope 104 over the second FSO link 324. To regenerate the FSO signal pulses, the optical regenerator 304 extracts a significantly small part, for example, only 5% of the optical power of the FSO signal pulses received over the first FSO link 322 to generate the negative electric voltage. A significantly large part, for example, 95% of the optical power of the FSO signal pulses received over the first FSO link 322 is used for retransmission of the FSO signal pulses to the FSO receiver telescope 104 over the second FSO link 324. The optical regenerator 304 includes the EAM 316 which uses the negative electric voltage generated from the first part of the FSO signal pulses to suppress the intensity variations in the optical pulses of the second part of the FSO signal pulses. In an aspect of the present disclosure, the EAM 316 may be a semiconductor device which may be realized using one or more semiconductor materials, require zero biasing voltage and low driving voltages. The EAM 316 may be easily integrated with semiconductor optical amplifiers and other semiconductor devices and/or materials on a single chip.

Figure 4:
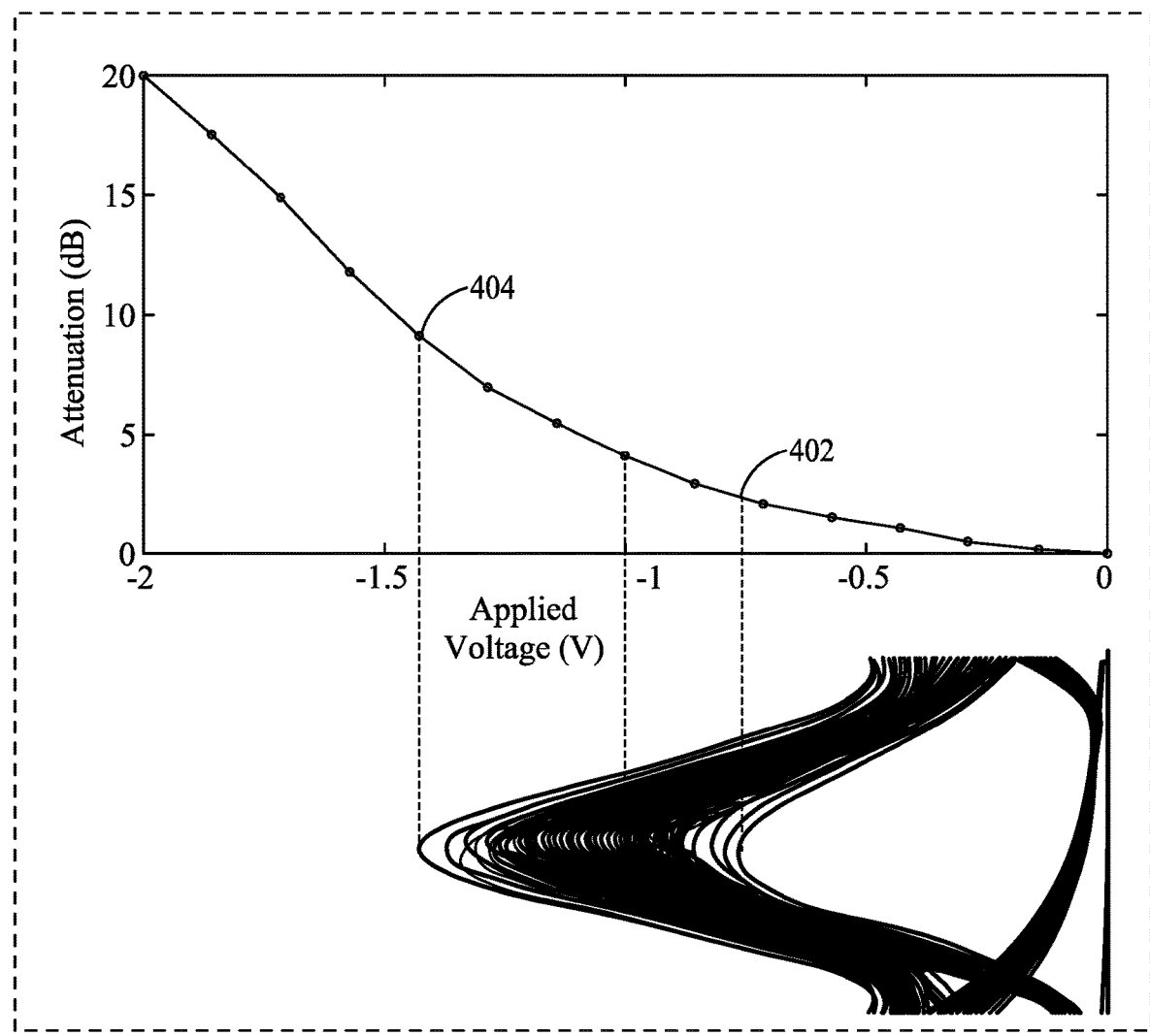
FIG. 4 is a graphical diagram showing attenuation versus applied electric voltage curve for an electro-absorption modulator (EAM), according to exemplary aspects of the present disclosure.

FIG. 4 depicts a graphical diagram showing attenuation versus applied electric voltage curve for an electro-absorption modulator (EAM), according to exemplary aspects of the present disclosure.

The EAM 316 as discussed herein with reference to FIG. 3 works on the principle of Franz-Keldysh effect, i.e., a change in the absorption spectrum caused by an applied electric field changes the bandgap energy. The EAM 316 may be realized using a semiconductor material whose effective bandgap decreases when the electric voltage is applied to its terminals. Reduction in the bandgap of the semiconductor material may result in absorption of the FSO signal pulses, thus, increasing the attenuation of the EAM 316. In the absence of applied electric voltage, the EAM 316 may have minimum attenuation. As the magnitude of the applied electric voltage is increased, the bandgap may decrease and the attenuation of the semiconductor material may increase, resulting in absorption of the FSO signal pulses. The attenuation induced by the EAM 316 may vary in accordance with the variations in levels of applied electric voltage.

For the purpose of understanding the relationship between attenuation and applied electric voltage for the EAM 316, the FSO signal pulses used to obtain the attenuation versus applied electric voltage curve in FIG. 4 has a center wavelength of 1552 nm and the applied electric voltage has a negative polarity.

The horizontal axis represents the magnitude of the applied electric voltage in volts (V) and the vertical axis represents the magnitude of attenuation in decibels (dB) induced by the EAM 316 on optical pulses of the FSO signal pulses. As depicted in FIG. 4, when the magnitude of applied electric voltage is zero, minimum attenuation is induced by the EAM 316. As the magnitude of the applied electric voltage is increased, the attenuation induced by the EAM 316 also increases.

The first FSO link 322 may induce intensity variations on the FSO signal pulses due to turbulence. These intensity variations may be observed from the eye-diagram oriented along the axis of the applied electric voltage in FIG. 4. An approximately linear region, for example, the region of the curve between coordinates 402 and 404 on the attenuation versus applied electric voltage plot may be chosen and the voltage excursions of the eye-diagram may be adjusted on that region. Therefore, the attenuation induced by the EAM 316 varies in accordance with the variations in the voltage levels of the eye-diagram. The gain of the inverting EA 314 may be suitably adjusted to adjust the minimum and maximum values of the applied electric voltage along the approximately linear region of the curve shown in FIG. 4. As can be seen from the eye-diagram, optical pulses having higher intensities (absolute values of the amplitudes) are attenuated more relative to optical pulses having lower intensities. This results in suppressing intensity variations of the optical pulses in the FSO signal pulses obtained at the output of the EAM 316. The applied electric voltage of the EAM 316 may vary over time depending upon fluctuations of the FSO signal pulses to be regenerated.

Figure 5:
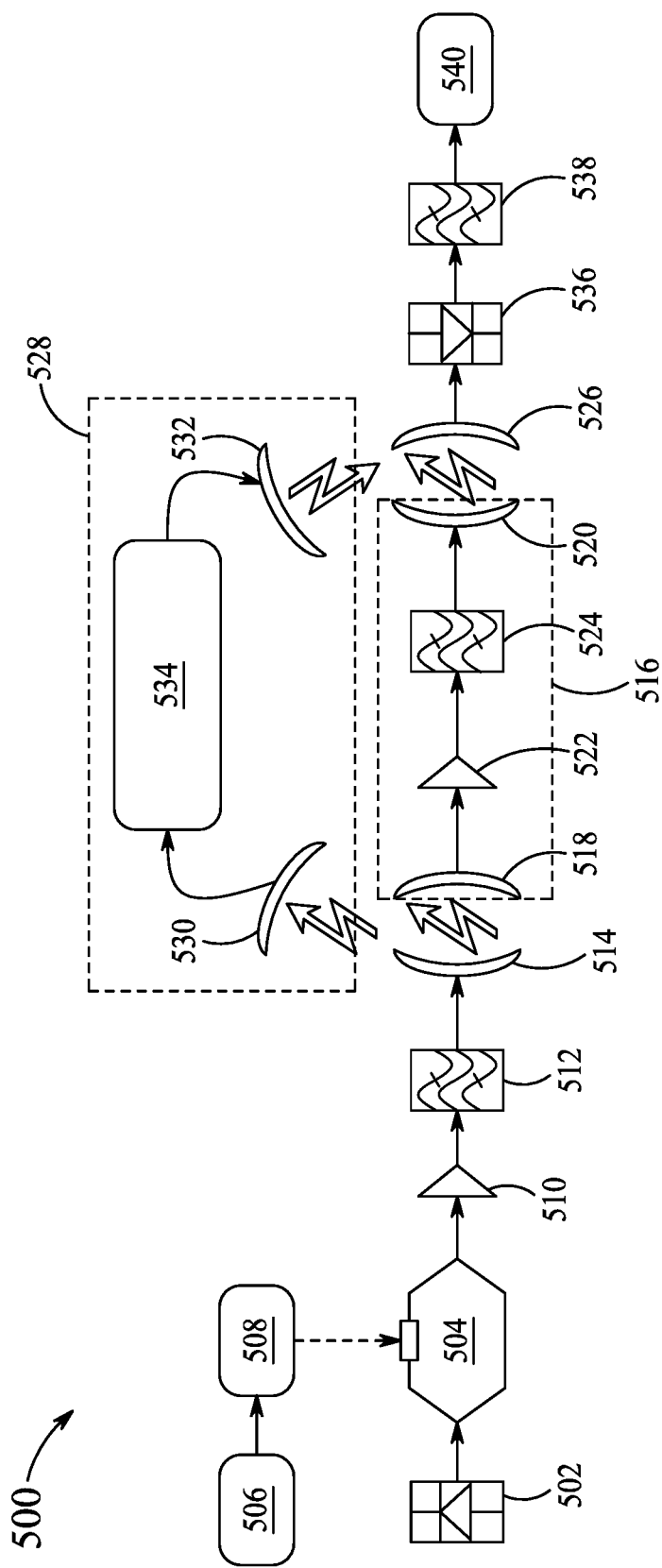
FIG. 5 is a schematic diagram of a simulation setup for comparing performances of all optical amplify and forward (AOAF) based relay node and all optical regenerate and forward (AORF) based relay node, according to exemplary aspects of the present disclosure.

FIG. 5 depicts a schematic diagram of a simulation setup 500 for comparing performances of all optical amplify and forward (AOAF) based relay node and all optical regenerate and forward (AORF) based relay node.

According to aspects of the present disclosure, the simulation setup 500 may include a continuous-wave (CW) laser diode 502, a Mach-Zehnder modulator (MZM) 504, a pseudorandom binary sequence (PRBS) generator 506, a return-to-zero pulse generator (RZPG) 508, a first OA 510, a first OBPF 512, a FSO transmitter telescope 514, an AOAF based relay node 516, an AORF based relay node 528, a FSO receiver telescope 526, a photodetector 536, an electrical low pass filter (ELPF) 538, and a bit error rate (BER) analyzer 540.

The AOAF based relay node 516 may include a first receiver telescope 518, a first transmitter telescope 520, a second optical amplifier (OA) 522, and a second optical bandpass filter (OBPF) 524. In an aspect of the present disclosure, the AOAF based relay node 516 may correspond to the AOAF based relay node 200 of FIG. 2. The AORF based relay node 528 may include a second receiver telescope 530, a second transmitter telescope 532, and an optical regenerator 534. In an aspect of the present disclosure, the AORF based relay node 528 may correspond to the AORF based relay node 300 of FIG. 3 and the optical regenerator 534 may correspond to the optical regenerator 304 of FIG. 3.

The CW laser diode 502 has a linewidth of 10 MHz and has a center wavelength of 1552 nm. In an aspect of the present disclosure, the CW laser diode 502 may correspond to laser diodes that are designed to be driven in continuous wave (CW) mode. The CW laser diode 502 may be driven in the continuous wave mode to output optical power to the MZM 504.

The PRBS generator 506 may generate a random binary sequence i.e., random sequence of bits (1s and 0s) and output the random binary sequence to the RZPG 508. The RZPG 508 may use the random binary sequence to generate return-to-zero (RZ) signal. In an aspect of the present disclosure, the RZ signal may correspond to a pattern of voltage, current, or photons used to represent digital data (comprising a sequence of 0's and 1's) in which the signal returns (drops) to zero between each pulse, even if a number of consecutive 0s or 1s occur in the signal. In an aspect of the present disclosure, output of the RZPG 508 is an RZ electrical signal i.e., a pattern of voltage representing the random binary sequence. The RZPG 508 outputs the RZ signal to the MZM 504. The RZ signal may be used to modulate the optical power output from the CW laser diode 502.

The MZM 504 may intensity modulate the optical power output from the CW laser diode 502 by the RZ signal. In an aspect of the present disclosure, the RZ signal may be a Gaussian-shaped electrical data at 6 Gbps. In an aspect of the present disclosure, the MZM 504 may control the intensity (or amplitude) of the received optical power using electric voltage. An input waveguide of the MZM 504 is split up into two waveguide interferometer arms. When an electric voltage is applied across one of the arms, a phase shift is induced for the optical power passing through that arm. When the two arms are recombined, the phase difference between the optical power at each arm is converted to an amplitude modulation.

In a non-limiting example, the MZM 504 may output FSO signal pulses comprising optical pulses having a duty cycle of 25%. The first OA 510 may amplify the FSO signal pulses and output the amplified FSO signal pulses to the first OBPF 512. The first OA 510 has a noise figure of 4 dB. The FSO signal pulses are passed through the first OBPF 512 to remove out-of-band amplified spontaneous emission (ASE) noise. The first OBPF 512 has a bandwidth of 40 GHz. The FSO signal pulses output from the first OBPF 512 may be transmitted over a 1 km FSO link by the FSO transmitter telescope 514. The FSO transmitter telescope 514 has an aperture diameter of 5 cm. The 1 km FSO link has an atmospheric attenuation of 3 dB/km and is modeled using Gamma-Gamma channel model suitable for medium and strong turbulence conditions.

In an aspect of the present disclosure, the FSO signal pulses are transmitted to the AOAF based relay node 516 and AORF based relay node 528. A first FSO link of 1 km is established between the FSO transmitter telescope 514 and the first receiver telescope 518 of the AOAF based relay node 516 and a second FSO link of 1 km is established between the FSO transmitter telescope 514 and the second receiver telescope 530 of the AORF based relay node 528. Both, the first FSO link and the second FSO link, have an atmospheric attenuation of 3 dB/km and are modelled using a Gamma-Gamma channel model suitable for medium and strong turbulence conditions. The simulation setup 500 tests performance of the AORF based relay node under medium and strong turbulence conditions by choosing the refractive index structure parameters as $5 \times 10^{-15}$ $m^{-2/3}$ and $5 \times 10^{-10}$ $m^{-2/3}$. The power of the FSO signal pulses transmitted over the first FSO link and the second FSO link is 15 dBm.

The first receiver telescope 518 and the second receiver telescope 530 receive the FSO signal pulses having beam divergence of 2 mrad after transmission over the first FSO link and the second FSO link, respectively.

For the AOAF based relay node 516, the first receiver telescope 518 outputs the received FSO signal pulses to the second OA 522 which amplifies the received FSO signal pulses. The second OA 522 outputs the amplified FSO signal pulses to the second OBPF 524. The second OBPF 524 bandpass filters the amplified FSO signal pulses. The second OBPF 524 is centered at 1552 nm and has a bandwidth of 40 GHz. The AOAF based relay node 516 processes the received FSO signal pulses in the same manner as the AOAF based relay node 200 explained in the present disclosure with reference to FIG. 2. The second OBPF 524 outputs the amplified FSO signal pulses to the first transmitter telescope 520.

For the AORF based relay node 528, the second receiver telescope 530 outputs the received FSO signal pulses to the optical regenerator 534. In the simulation setup 500, the optical regenerator 534 splits the received FSO signal pulses into a first path receiving 5% of optical power of the FSO signal pulses and a second path receiving 95% of the optical power of the FSO signal pulses. The optical regenerator 534 regenerates the received FSO signal pulses in the same manner as the optical regenerator 304 explained in the present disclosure with reference to FIG. 3. The optical regenerator 534 outputs the regenerated FSO signal pulses to the second transmitter telescope 532.

In the simulation setup 500, the electrical and optical components, included in both the AOAF based relay node 516 and the AORF based relay node 528, have the same configuration. The first transmitter telescope 520 transmits the amplified FSO signal pulses to the FSO receiver telescope 526 over a third FSO link of 1 km and the second transmitter telescope 532 transmits the regenerated FSO signal pulses to the FSO receiver telescope 526 over a fourth FSO link of 1 km. The FSO receiver telescope 526 has an aperture diameter of 20 cm. Both the amplified FSO signal pulses from the AOAF based relay node 516 and the regenerated FSO signal pulses from the AORF based relay node 528, received at the FSO receiver telescope 526 are output to the photodetector 536. The photodetector 536 has a responsivity of 0.9 A/W. The photodetector 536 converts the amplified FSO signal pulses into a first electrical signal and the regenerated FSO signal pulses into a second electrical signal. The first electrical signal and the second electrical signal are low-passed filtered by the ELPF 538. The ELPF 538 outputs the first electrical signal and the second electrical signal to the BER analyzer 540. The BER analyzer 540 analyzes and compares the performance of the AOAF based relay node 516 and the AORF based relay node 528 using the first electrical signal (obtained from the FSO signal pulses amplified by the AOAF based relay node 516) and the second electrical signal (obtained from the FSO signal pulses regenerated by the AORF based relay node 528).

In an aspect of the present disclosure, the simulation setup 500 may be designed using a commercial tool, such as OptiSystem 17 and the performance of the AOAF based relay node 516 and the AORF based relay node 528 may be analyzed based on BER results.

In an aspect of the present disclosure, in the Gamma-Gamma channel model, the intensity I of the FSO signal pulses propagating through the FSO link may undergo fluctuations that are either small-scale $\alpha$ or large-scale $\beta$, depending upon atmospheric conditions. These fluctuations may have a Gamma distribution with probability density function $\rho(I)$ that may be written as:

$$\rho(I) = \frac{2(\alpha\beta)^{\frac{\alpha+\beta}{2}}}{\Gamma(\alpha)\Gamma(\beta)} I^{\frac{(\alpha+\beta)}{2}-1} K_{(\alpha-\beta)}(2\sqrt{\alpha\beta I}) \quad (1)$$

where, $K_{(\alpha-\beta)}$ represents the modified Bessel function of second kind having order $\alpha-\beta$, and $\Gamma(\bullet)$ is the Gamma function that is related to the propagation distance d as:

$$\Gamma(d) = \int_0^\infty \exp(-t) t^{d-1} dt \quad (2)$$

The small-scale $\alpha$ and the large-scale $\beta$ eddies of the scattering process for a plane wave propagating through isotropic and homogeneous atmospheric turbulence may be expressed as:

$$\alpha = \left[ \exp\left( \frac{0.49\sigma_I^2}{\left(1 + 1.11\sigma_I^{\frac{12}{5}}\right)^{\frac{7}{6}}} \right) - 1 \right]^{-1} \quad (3)$$

$$\beta = \left[ \exp\left( \frac{0.51\sigma_I^2}{\left(1 + 0.69\sigma_I^{\frac{12}{5}}\right)^{\frac{5}{6}}} \right) - 1 \right]^{-1} \quad (4)$$

where, $\sigma_I^2$ is the scintillation index that provides a measure of the variance of normalized intensity I of the received FSO signal pulses and may be written in terms of ensemble average $<\bullet>$ as $$\sigma_I^2 = \frac{<I^2>}{<I>^2} - 1 \quad (5)$$

The scintillation index may be written in terms of the propagation distance d and the optical wave number $k=2\pi/\lambda$ as:

$$\sigma_I^2 = 1.23 C_n^2 k^{7/6} d^{11/6} \quad (6)$$

where, $C_n^2$ is known as the refractive index structure parameter that gives a measure of the strength of the atmospheric turbulence. The refractive index structure parameter $C_n^2$ has a strong dependence on the temperature variations of the atmosphere and can vary between $10^{-17}$ to $10^{-10}$ for weak to strong turbulence, respectively.

To observe the performance of the optical regenerator (304, 534) used in the AORF based relay node (300, 528), medium and strong turbulence conditions are considered by choosing the refractive index structure parameters as $5 \times 10^{-15}$ $m^{-2/3}$ and $5 \times 10^{-10}$ $m^{-2/3}$. Power of the FSO signal pulses transmitted over the first FSO link of 1 km, and the second FSO link of 1 km is 15 dBm.

In an aspect of the present disclosure, results obtained to elaborate effect of the optical regenerator (304, 534) on the FSO link are discussed with reference to FIGS. 6A-D. FIGS. 6A-6D depict graphical eye-diagrams of the FSO signal pulses under strong turbulence conditions at different points of the simulation setup 500.

Figure 6B:
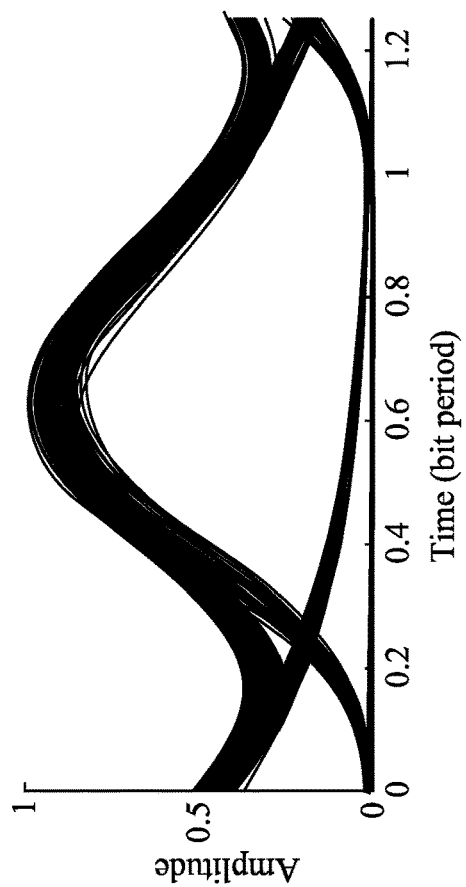
FIG. 6B is a graphical eye-diagram showing FSO signal pulses at output of an optical regenerator, according to exemplary aspects of the present disclosure.
Figure 6D:
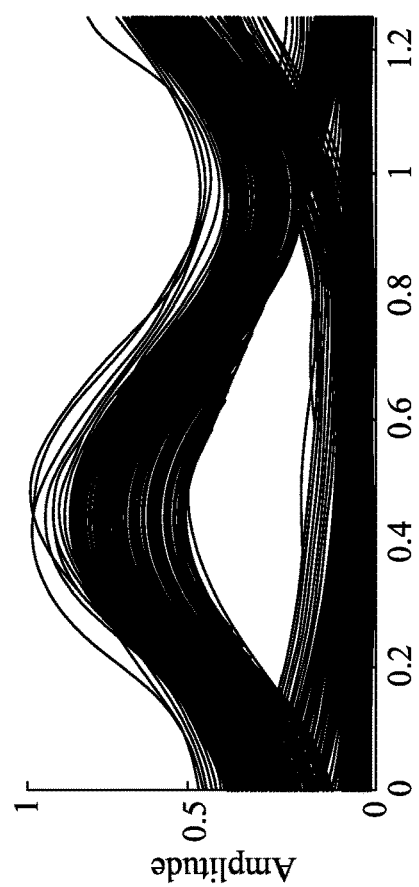
FIG. 6D is a graphical eye-diagram showing FSO signal pulses from a relay node with an optical regenerator, according to exemplary aspects of the present disclosure.
Figure 6A:
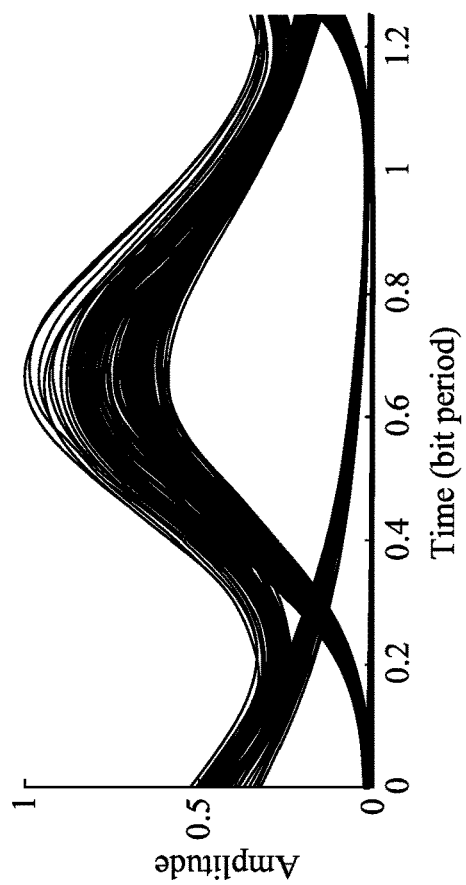
FIG. 6A is a graphical eye-diagram showing FSO signal pulses at input of an optical regenerator, according to exemplary aspects of the present disclosure.
Figure 6C:
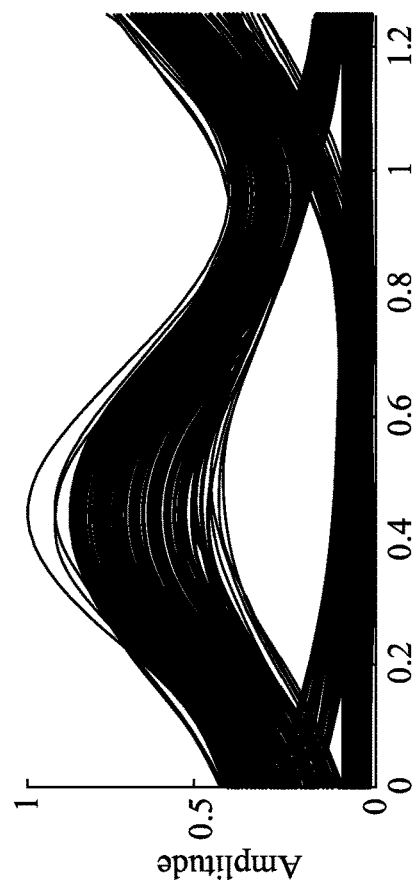
FIG. 6C is a graphical eye-diagram showing FSO signal pulses from a relay node without an optical regenerator, according to exemplary aspects of the present disclosure.

FIG. 6A depicts a graphical eye-diagram showing the FSO signal pulses at the input of the optical regenerator (304, 534), FIG. 6B depicts a graphical eye-diagram showing the FSO signal pulses at the output of an optical regenerator (304, 534), FIG. 6C depicts a graphical eye-diagram showing the FSO signal pulses from the AOAF based relay node (200, 516) without the optical regenerator (304, 534), and FIG. 6D depicts a graphical eye-diagram showing the FSO signal pulses from the AORF based relay node (300, 528) having the optical regenerator (304, 534), according to exemplary aspects of the present disclosure.

FIG. 6A shows the eye-diagram of the FSO signal pulses at the input of the optical regenerator (304, 534) after passing through the second FSO link of 1 km. From FIG. 6A, it may be observed that strong intensity variations are induced over the FSO signal pulses due to atmospheric turbulence i.e., the optical pulses in the FSO signal pulses are of varying intensities. The FSO signal pulses having strong intensity variations are given as input to the optical regenerator (304, 534), where the FSO signal pulses are split into the first path and the second path. The FSO signal pulses in the first path are photodetected to generate electrical signal, and the electrical signal is low pass filtered, amplified, polarity reversed, and applied to the electrical input of the EAM 316. The FSO signal pulses in the second path are given to the optical input of the EAM 316. Based on the principle discussed earlier with reference to FIG. 3, the optical pulses having higher intensities (or amplitudes) are attenuated more compared to the optical pulses having lower intensities, resulting in regenerated FSO signal pulses. Therefore, the regenerated FSO signal pulses obtained at the output of the optical regenerator (304, 534) have reduced intensity variations, as shown in FIG. 6B. The regenerated FSO signal pulses are then transmitted to the FSO receiver telescope 104.

For the AOAF based relay node (200, 516), the FSO signal pulses received after passing through the first FSO link of 1 km are simply amplified, bandpass filtered and transmitted to the FSO receiver telescope 104. The AOAF based relay node (200, 516) does not regenerate the FSO signal pulses to suppress the intensity variations. FIG. 6C shows the eye-diagram of the FSO signal pulses received at a bit error rate (BER) of $10^{-9}$ from the AOAF based relay node (200,516). Further, as described above, the AORF based relay node (300, 528) regenerates the FSO signal pulses to suppress intensity variations. FIG. 6D shows the eye-diagram of the regenerated FSO signal pulses received at the BER of $10^{-9}$ from the AORF based relay node (300, 528).

Figure 7:
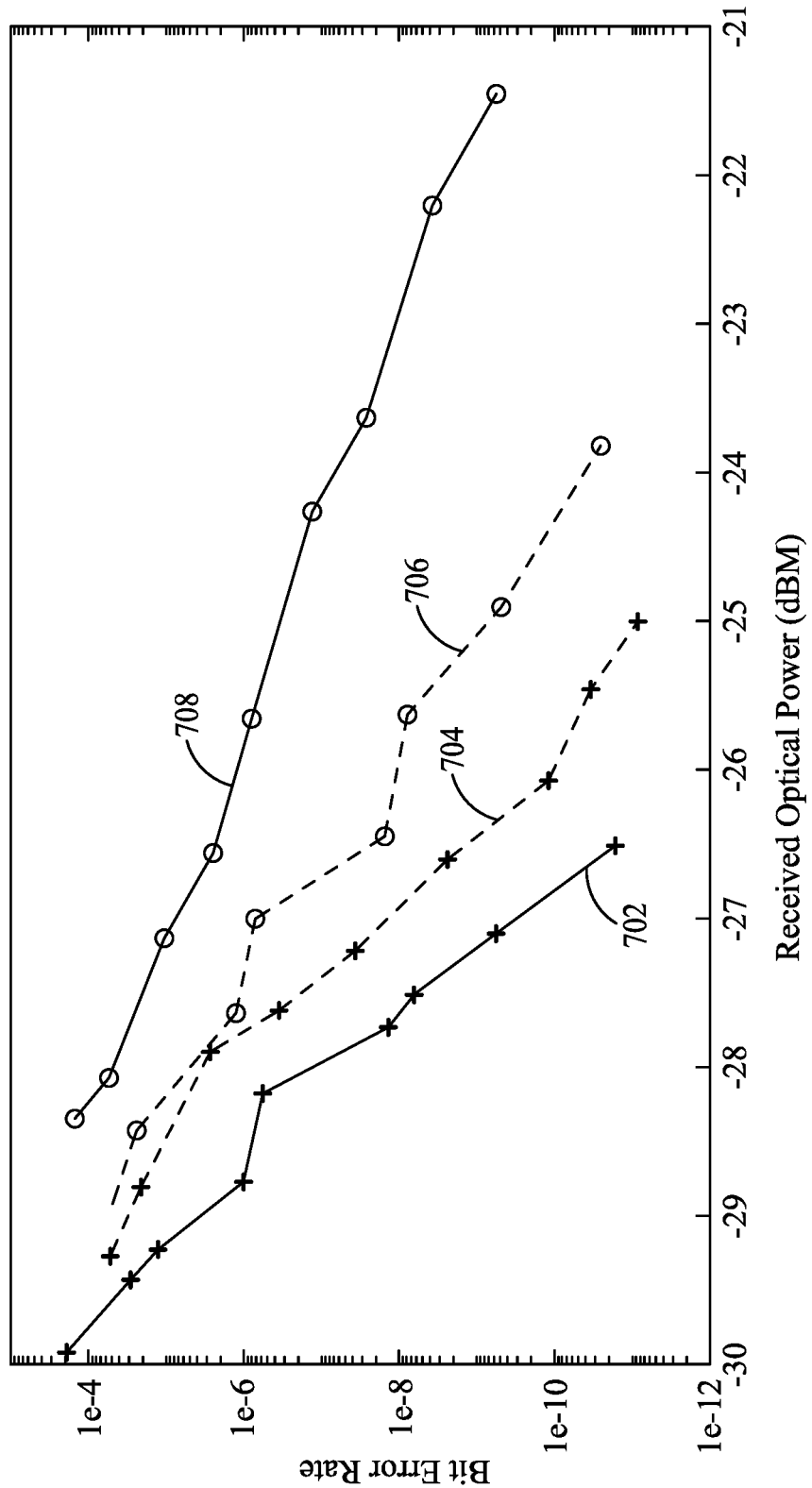
FIG. 7 is a graphical diagram showing bit error rate (BER) versus received optical power plots for medium and strong turbulence conditions, according to exemplary aspects of the present disclosure.

FIG. 7 depicts a graphical diagram showing bit error rate (BER) versus received optical power plots for medium and strong turbulence conditions, according to exemplary aspects of the present disclosure.

FIG. 7 shows a first BER performance curve 702 of the FSO signal pulses received from the AOAF based relay node (200, 516) under medium turbulence conditions, a second BER performance curve 704 of the FSO signal pulses received from the AORF based relay node (300, 528) under medium turbulence conditions, a third BER performance curve 706 of the FSO signal pulses received from the AORF based relay node (300, 528) under strong turbulence conditions, and a fourth BER performance curve 708 of the FSO signal pulses received from the AOAF based relay node (200, 516) under extreme turbulence conditions. The BER performance curves 702, 704, 706, and 708 are obtained by using statistical parameters of the eye-diagrams of the FSO signal pulses received from the AOAF based relay node (200, 516) and AORF based relay node (300, 528).

It may be observed from the fourth BER performance curve 708 and the third BER performance curve 706, that under strong turbulence conditions, the received optical power required to achieve a BER of $10^{-9}$ for the AOAF based relay node (200, 516) is −21.5 dBm and for the AORF based relay node (300, 528) is −25 dBm, respectively. Therefore, a significant reduction of 3.5 dBm in power penalty is achieved by regenerating the FSO signal pulses using the optical regenerator (304, 534) in the AORF based relay node (300, 528) in a strong turbulence scenario.

Further, as shown in FIG. 4, the mean of the intensity variations on marks of the FSO signal pulses is adjusted along the center of the linear region of the attenuation versus applied electric voltage curve for the EAM 316. Once the mean value is adjusted for the strong turbulence conditions, significant reduction in the intensity variations of the optical pulses is obtained at the output of the EAM 316.

However, when the turbulence condition changes from strong to medium, the intensity variations on marks of the FSO signal pulses are reduced and the mean of the reduced intensity variations is shifted from optimum value. The optimum value is the value of the bias voltage on the horizontal axis where maximum compression of intensity fluctuations is achieved. This optimum value varies slightly with variations in the intensity fluctuations of the received optical pulsed signal.

Therefore, it may be observed from the first BER performance curve 702 and the second BER performance curve 704, that under medium turbulence conditions, the received optical power required to achieve a BER of $10^{-9}$ for the AOAF based relay node (200, 516) is approximately −27 dBm and for the AORF based relay node (300, 528) is approximately −26.5 dBm, respectively. Therefore, for medium turbulence conditions the optical regenerator (304, 534) of the AORF based relay node (300, 528) may increase the intensity variations by a small amount, resulting in a power penalty of around 0.5 dBm, as shown in FIG. 7.

However, the power penalty resulting from the optical regenerator (304, 534) under medium turbulence conditions may be eliminated by dynamically adjusting the mean of the intensity variations in accordance with varying turbulence conditions. In an aspect of the present disclosure, a bias voltage of the EAM 316 may be adaptively varied in accordance with the turbulence conditions to eliminate the power penalty induced due to varying turbulence conditions. Further, the power penalty resulting from the use of optical regenerator (304, 534) in medium turbulence conditions is very less, and therefore, adaptive adjustment of the bias voltage of the EAM 316 may not be required.

Figure 8:
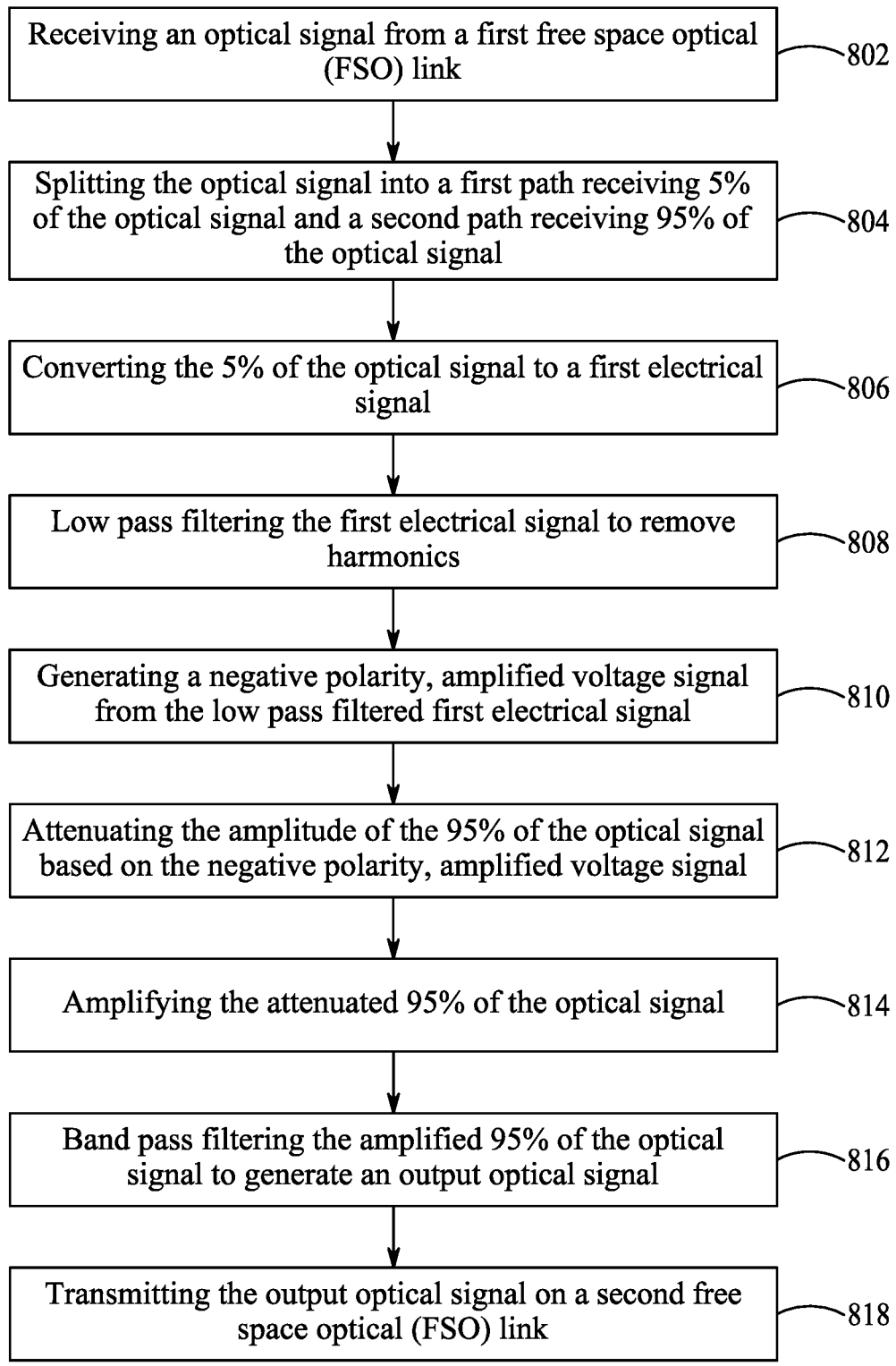
FIG. 8 is an exemplary flowchart of a method for regeneration of FSO signal pulses, according to exemplary aspects of the present disclosure.

FIG. 8 is an exemplary flowchart of method 800 for regeneration of FSO signal pulses, according to exemplary aspects of the present disclosure.

At step 802, the method 800 includes receiving, by the receiver telescope 302, the FSO signal pulses from the first FSO link 322.

At step 804, the method 800 includes splitting, by the optical splitter 308, the FSO signal pulses into a first path receiving 5% of the FSO signal pulses and a second path receiving 95% of the FSO signal pulses. In an aspect of the present disclosure, splitting the FSO signal pulses may correspond to splitting optical power of the FSO signal pulses. The first path may receive 5% of total optical power of the FSO signal pulses, and the second path may receive 95% of the total optical power of the FSO signal pulses.

At step 806, the method 800 includes converting, by the photodetector (310), the 5% of the FSO signal pulses to the electrical signal.

At step 808, the method 800 includes low pass filtering the electrical signal, by the ELPF 312, to remove harmonics from the electrical signal.

At step 810, the method 800 includes generating the negative polarity electrical signal, by the inverting EA 314, from the low pass filtered electrical signal and amplifying the negative polarity electrical signal by the inverting EA 314.

At step 812, the method 800 includes attenuating the amplitude of the 95% of the FSO signal pulses based on the negative polarity electrical signal, by the EAM 316, to regenerate the FSO signal pulses.

At step 814, the method 800 includes amplifying, by the OA 318, the attenuated 95% of the FSO signal pulses. The attenuated 95% of the FSO signal pulses correspond to the regenerated FSO signal pulses.

At step 816, the method 800 includes band pass filtering, by the OBPF 320, the amplified 95% of the FSO signal pulses to generate output FSO signal pulses.

At step 818, the method 800 includes transmitting, by the transmitter telescope 306, the output FSO signal pulses on the second FSO link 324.

The first embodiment is illustrated with respect to FIGS. 1-8. The first embodiment describes a method for optical regeneration of optical communications. The method includes receiving, by a first receiver telescope, free space optical (FSO) signal pulses from a first FSO link; splitting, by an optical splitter, the FSO signal pulses into a first path receiving 5% of the FSO signal pulses and a second path receiving 95% of the FSO signal pulses; converting, by a first photodetector, $PD_1$, the 5% of the FSO signal pulses to a first electrical signal; low pass filtering the first electrical signal, by a first electrical low pass filter, $ELPF_1$, to remove harmonics; generating a negative polarity, amplified voltage signal, by an inverting electrical amplifier, EA, from the low pass filtered first electrical signal; attenuating the amplitude of the 95% of the FSO signal pulses based on the negative polarity, amplified voltage signal, by an electro-absorption modulator, EAM; amplifying, by a first optical amplifier, $OA_1$, the attenuated 95% of the FSO signal pulses; band pass filtering, by a first optical band pass filter, $OBPF_1$, the amplified 95% of the FSO signal pulses to generate output FSO signal pulses; and transmitting, by a first transmitter telescope, the output FSO signal pulses on a second FSO link.

The method further comprises receiving the 95% of the FSO signal pulses at an optical input of the electro-absorption modulator; receiving the negative polarity, amplified voltage signal at an electrical input of the electro-absorption modulator; and attenuating intensity fluctuations of the 95% of the FSO signal pulses by increasing or decreasing an amplitude of the negative polarity, amplified voltage signal.

The method further comprises increasing the attenuation of the intensity fluctuations of the 95% of the FSO signal pulses by increasing the amplitude of the negative polarity, amplified voltage signal, thereby increasing a bandgap of an intrinsic depletion region of the electro-absorption modulator.

The method further comprises decreasing a bandgap of the intrinsic depletion region of the electro-absorption modulator by decreasing the amplitude of the negative polarity, amplified voltage signal, thereby decreasing the attenuation of the intensity fluctuations of the 95% of the FSO signal pulses.

The method further comprises adjusting the amplitude of the negative polarity, amplified voltage signal by adjusting a gain control of the inverting electrical amplifier thereby attenuating the FSO signal pulses having varying intensities.

The method further comprises generating an optical power output by a continuous wave (CW) laser diode; generating modulated optical pulses, by a Mach-Zehnder modulator, MZM, from the optical power output; generating amplified modulated optical pulses by a second optical amplifier, $OA_2$, connected to the MZM; generating the FSO signal pulses by filtering out-of-band amplified spontaneous emission noise from the amplified modulated optical pulses, by a second optical band pass filter, $OBPF_2$; and transmitting the FSO signal pulses, by a second transmitter telescope, over the first FSO link to the first receiver telescope.

The method further comprises receiving, by a second receiver telescope, the output FSO signal pulses; converting, by a second photodetector, $PD_2$, the output FSO signal pulses to a second electrical signal; filtering the second electrical signal, by a second electrical low pass filter, $ELPF_2$; and calculating, by a bit error rate (BER) analyzer, a bit error rate of the filtered second electrical signal.

The second embodiment is illustrated with respect to FIGS. 1-8. The second embodiment describes a free space optical (FSO) communication system. The system comprises a relay node. The relay node comprises a first receiver telescope, an optical regenerator, and a first transmitter telescope. The first receiver telescope is configured to receive FSO signal pulses on a first free space optical (FSO) link. The optical regenerator comprises: an optical splitter configured to split the FSO signal pulses into a first path receiving 5% of the FSO signal pulses and a second path receiving 95% of the FSO signal pulses; a first photodetector, $PD_1$, located on the first path, the first photodetector configured to convert the 5% of the FSO signal pulses to a first electrical signal; a first electrical low pass filter, $ELPF_1$, connected to the photodetector, the first electrical low pass filter configured to remove harmonics from the first electrical signal; an inverting electrical amplifier, EA, connected to the first electrical low pass filter and configured to generate a negative polarity, amplified voltage signal from the first electrical signal; an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal; a first optical amplifier, $OA_1$, connected to an optical output of the electro-absorption modulator and configured to amplify the attenuated 95% of the FSO signal pulses; and a first optical band pass filter, $OBPF_1$, connected to the first optical amplifier and configured to filter the frequency of the amplified 95% of the FSO signal pulses and generate output FSO signal pulses. The first transmitter telescope is configured to transmit the output FSO signal pulses on a second free space optical (FSO) link.

The electro-absorption modulator further comprising: a bulk semiconductor waveguide having a structure formed by an intrinsic depletion region between a p-type semiconductor and an n-type semiconductor; the electrical input connected to the p-type semiconductor; a ground connected to the n-type semiconductor; wherein the negative polarity, amplified voltage signal is applied perpendicularly across the intrinsic depletion region with respect to a direction of the 95% of the FSO signal pulses on the second path; and wherein a bandgap of the intrinsic depletion region is configured to increase or decrease based on an amplitude of the negative polarity, amplified voltage signal, thereby attenuating intensity fluctuations of the 95% of the FSO signal pulses.

The FSO communication system, further comprising a bias voltage source connected to the second input.

The bandgap of the intrinsic depletion region is configured to increase with the increase in the amplitude of the negative polarity, amplified voltage signal, thereby increasing the attenuation of the intensity fluctuations of the 95% of the FSO signal pulses.

The bandgap of the intrinsic depletion region is configured to decrease with the decrease in the amplitude of the negative polarity, amplified voltage signal, thereby decreasing the attenuation of the intensity fluctuations of the 95% of the FSO signal pulses.

The FSO communication system, further comprising a gain control in the inverting electrical amplifier, EA, wherein the gain control is configured to adjust the amplitude of the negative polarity, amplified voltage signal to suppress variation in intensities of the FSO signal pulses.

The FSO communication system, further comprising a first transmitter including: a continuous wave (CW) laser diode configured to generate an optical power output; a Mach-Zehnder modulator, MZM, configured to receive the optical power output and generate modulated optical pulses; a second optical amplifier, $OA_2$, connected to the MZM and configured to generate amplified modulated optical pulses; a second optical band pass filter, $OBPF_2$, configured to filter out-of-band amplified spontaneous emission noise from the amplified modulated optical pulses to generate the FSO signal pulses; and a second transmitter telescope configured to transmit the FSO signal pulses over the first FSO link to the first receiver telescope.

The FSO communication system, further comprising: a second receiver telescope connected to the second FSO link; a second photodetector, $PD_2$, configured to receive the output FSO signal pulses and convert the output FSO signal pulses to a second electrical signal; a second electrical low pass filter, $ELPF_2$, connected to the second photodetector, the $ELPF_2$ configured to filter the second electrical signal to generate a filtered second electrical signal; and a bit error rate (BER) analyzer connected to the $ELPF_2$, the BER analyzer configured to calculate a bit error rate of the filtered second electrical signal.

The third embodiment is illustrated with respect to FIGS. 1-8. The third embodiment describes a system for optical regeneration of optical communications, comprising a first transmitter, a relay node, and a second receiver telescope. The first transmitter is configured to transmit free space optical (FSO) signal pulses on a first FSO link. The relay node includes: a first receiver telescope configured to receive the FSO signal pulses; an optical splitter configured to split the FSO signal pulses into a first path receiving 5% of the FSO signal pulses and a second path receiving 95% of the FSO signal pulses; a first photodetector, $PD_1$, located on the first path, the first photodetector configured to convert the 5% of the FSO signal pulses to a first electrical signal; a first electrical low pass filter, $ELPF_1$, connected to the photodetector, the first electrical low pass filter configured to remove harmonics from the first electrical signal; an inverting electrical amplifier, EA, connected to the first electrical low pass filter and configured to generate a negative polarity, amplified voltage signal from the first electrical signal; an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal; a first optical amplifier, $OA_1$, connected to an optical output of the electro-absorption modulator and configured to amplify the attenuated 95% of the FSO signal pulses; a first optical band pass filter, $OBPF_1$, connected to the first optical amplifier and configured to filter the frequency of the amplified 95% of the FSO signal pulses and generate output FSO signal pulses; and a second transmitter telescope configured to transmit the output FSO signal pulses on a second FSO link. The second receiver telescope is configured to receive the output FSO signal pulses on the second FSO link.

The system for optical regeneration of optical communications, further comprising: the first transmitter including: a continuous wave (CW) laser diode configured to generate an optical power output; a Mach-Zehnder modulator, MZM, configured to receive the output power output and generate modulated optical pulses; a second optical amplifier, $OA_2$, connected to the MZM and configured to generate amplified modulated optical pulses; a second optical band pass filter, $OBPF_2$, configured to filter out-of-band amplified spontaneous emission noise from the amplified modulated optical pulses to generate the FSO signal pulses; and a first transmitter telescope configured to transmit the FSO signal pulses over the first FSO link to the first receiver telescope.

The system for optical regeneration of optical communications, further comprising: a first receiver including: the second receiver telescope; a second photodetector, $PD_2$, configured to receive the output FSO signal pulses and convert the output FSO signal pulses to a second electrical signal; a second electrical low pass filter, $ELPF_2$, connected to the second photodetector, the $ELPF_2$ configured to filter the second electrical signal to generate a filtered second electrical signal; and a bit error rate (BER) analyzer connected to the $ELPF_2$, the BER analyzer configured to calculate a bit error rate of the filtered second electrical signal.

The electro-absorption modulator further comprising: a bulk semiconductor waveguide having an intrinsic depletion region between a p-type semiconductor and an n-type semiconductor; the electrical input connected to the p-type semiconductor; a ground connected to the n-type semiconductor; wherein the negative polarity, amplified voltage signal is applied perpendicularly across the intrinsic depletion region with respect to a direction of the 95% of the FSO signal pulses on the second path; and wherein a bandgap of the intrinsic depletion region is configured to increase or decrease based on an amplitude of the negative polarity, amplified voltage signal, thereby attenuating intensity fluctuations of the 95% of the FSO signal pulses.

The system for optical regeneration of optical communications, further comprising: a gain control in the inverting electrical amplifier, EA, wherein the gain control is configured to adjust the amplitude of the negative polarity, amplified voltage signal to suppress variation in intensities of the FSO signal pulses.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A free space optical (FSO) communication system, comprising:
a relay node, the relay node comprising:
a first receiver telescope configured to receive free space optical (FSO) signal pulses on a first free space optical (FSO) link;
an optical regenerator, the optical regenerator comprising:
an optical splitter configured to split the FSO signal pulses into a first path receiving 5% of the FSO signal pulses and a second path receiving 95% of the FSO signal pulses;
a first photodetector, $PD_1$, located on the first path, the first photodetector configured to convert the 5% of the FSO signal pulses to a first electrical signal;
a first electrical low pass filter, $ELPF_1$, connected to the photodetector, the first electrical low pass filter configured to remove harmonics from the first electrical signal;
an inverting electrical amplifier, EA, connected to the first electrical low pass filter and configured to generate a negative polarity, amplified voltage signal from the first electrical signal;
an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal;
a first optical amplifier, $OA_1$, connected to an optical output of the electro-absorption modulator and configured to amplify the attenuated 95% of the FSO signal pulses; and
a first optical band pass filter, $OBPF_1$, connected to the first optical amplifier and configured to filter the frequency of the amplified 95% of the FSO signal pulses and generate output FSO signal pulses; and
a first transmitter telescope configured to transmit the output FSO signal pulses on a second free space optical (FSO) link.

2. The FSO communication system of claim 1, the electro-absorption modulator further comprising:
a bulk semiconductor waveguide having an intrinsic depletion region between a p-type semiconductor and an n-type semiconductor;
the electrical input connected to the p-type semiconductor;
a ground connected to the n-type semiconductor;
wherein the negative polarity, amplified voltage signal is applied perpendicularly across the intrinsic depletion region with respect to a direction of the 95% of the FSO signal pulses on the second path; and
wherein a bandgap of the intrinsic depletion region is configured to increase or decrease based on an amplitude of the negative polarity, amplified voltage signal, thereby attenuating intensity fluctuations of the 95% of the FSO signal pulses.

3. The FSO communication system of claim 2, further comprising:
the negative polarity, amplified voltage signal is a bias voltage source for the electro-absorption modulator.

4. The FSO communication system of claim 2, further comprising:
wherein the bandgap of the intrinsic depletion region is configured to increase with the increase in the amplitude of the negative polarity, amplified voltage signal, thereby increasing the attenuation of the intensity fluctuations of the 95% of the FSO signal pulses.

5. The FSO communication system of claim 4, further comprising:
wherein the bandgap of the intrinsic depletion region is configured to decrease with the decrease in the amplitude of the negative polarity, amplified voltage signal, thereby decreasing the attenuation of the intensity fluctuations of the 95% of the FSO signal pulses.

6. The FSO communication system of claim 5, further comprising:
a gain control in the inverting electrical amplifier, EA, wherein the gain control is configured to adjust the amplitude of the negative polarity, amplified voltage signal to suppress variation in intensities of the FSO signal pulses.

7. The FSO communication system of claim 6, further comprising:
a first transmitter including:
a continuous wave (CW) laser diode configured to generate an optical power output;
a Mach-Zehnder modulator, MZM, configured to receive the optical power output and generate modulated optical pulses;
a second optical amplifier, $OA_2$, connected to the MZM and configured to generate amplified modulated optical pulses;
a second optical band pass filter, $OBPF_2$, configured to filter out-of-band amplified spontaneous emission noise from the amplified modulated optical pulses to generate the FSO signal pulses; and
a second transmitter telescope configured to transmit the FSO signal pulses over the first FSO link to the first receiver telescope.

8. The FSO communication system of claim 7, further comprising:
a second receiver telescope connected to the second FSO link;
a second photodetector, $PD_2$, configured to receive the output FSO signal pulses and convert the output FSO signal pulses to a second electrical signal;
a second electrical low pass filter, $ELPF_2$, connected to the second photodetector, the $ELPF_2$ configured to filter the second electrical signal to generate a filtered second electrical signal; and
a bit error rate (BER) analyzer connected to the $ELPF_2$, the BER analyzer configured to calculate a bit error rate of the filtered second electrical signal.

9. A method for all-optical regeneration of optical pulsed signals in free space optical communications, comprising:
receiving, by a first receiver telescope, free space optical (FSO) signal pulses from a first free space optical (FSO) link;
splitting, by an optical splitter, the FSO signal pulses into a first path receiving 5% of the FSO signal pulses and a second path receiving 95% of the FSO signal pulses;
converting, by a first photodetector, $PD_1$, the 5% of the FSO signal pulses to a first electrical signal;

low pass filtering the first electrical signal, by a first electrical low pass filter, $ELPF_1$, to remove harmonics;

generating a negative polarity, amplified voltage signal, by an inverting electrical amplifier, EA, from the low pass filtered first electrical signal;

attenuating the amplitude of the 95% of the FSO signal pulses based on the negative polarity, amplified voltage signal, by an electro-absorption modulator, EAM;

amplifying, by a first optical amplifier, $OA_1$, the attenuated 95% of the FSO signal pulses;

band pass filtering, by a first optical band pass filter, $OBPF_1$, the amplified 95% of the FSO signal pulses to generate output FSO signal pulses; and transmitting, by a first transmitter telescope, the output FSO signal pulses on a second free space optical (FSO) link.

10. The method for optical regeneration of optical communications of claim 9, comprising:

receiving the 95% of the FSO signal pulses at an optical input of the electro-absorption modulator;

receiving the negative polarity, amplified voltage signal at an electrical input of the electro-absorption modulator; and attenuating intensity fluctuations of the 95% of the FSO signal pulses by increasing or decreasing an amplitude of the negative polarity, amplified voltage signal.

11. The method for optical regeneration of optical communications of claim 10, comprising:

increasing the attenuation of the intensity fluctuations of the 95% of the FSO signal pulses by increasing the amplitude of the negative polarity, amplified voltage signal, thereby increasing a bandgap of an intrinsic depletion region of the electro-absorption modulator.

12. The method for optical regeneration of optical communications of claim 11, comprising:

decreasing a bandgap of the intrinsic depletion region of the electro-absorption modulator by decreasing the amplitude of the negative polarity, amplified voltage signal, thereby decreasing the attenuation of the intensity fluctuations of the 95% of the FSO signal pulses.

13. The method for optical regeneration of optical communications of claim 12, comprising:

adjusting the amplitude of the negative polarity, amplified voltage signal by adjusting a gain control of the inverting electrical amplifier thereby suppressing variation in intensities of the FSO signal pulses.

14. The method for optical regeneration of optical communications of claim 13, comprising:

generating an optical power output by a continuous wave (CW) laser diode;

generating modulated optical pulses, by a Mach-Zehnder modulator, MZM, from the optical power output;

generating amplified modulated optical pulses by a second optical amplifier, $OA_2$, connected to the MZM;

generating the FSO signal pulses by filtering out-of-band amplified spontaneous emission noise from the amplified modulated optical pulses, by a second optical band pass filter, $OBPF_2$; and transmitting the FSO signal pulses, by a second transmitter telescope, over the first FSO link to the first receiver telescope.

15. The method for optical regeneration of optical communications of claim 14, comprising:

receiving, by a second receiver telescope, the output FSO signal pulses;

converting, by a second photodetector, $PD_2$, the output FSO signal pulses to a second electrical signal;

filtering the second electrical signal, by a second electrical low pass filter, $ELPF_2$ to generate a filtered second electrical signal; and calculating, by a bit error rate (BER) analyzer, a bit error rate of the filtered second electrical signal.

16. A system for optical regeneration of optical communications, comprising:

a first transmitter configured to transmit free space optical (FSO) signal pulses on a first free space optical (FSO) link;

a relay node including:

a first receiver telescope configured to receive the FSO signal pulses;

an optical splitter configured to split the FSO signal pulses into a first path receiving 5% of the FSO signal pulses and a second path receiving 95% of the FSO signal pulses;

a first photodetector, $PD_1$, located on the first path, the first photodetector configured to convert the 5% of the FSO signal pulses to a first electrical signal;

a first electrical low pass filter, $ELPF_1$, connected to the photodetector, the first electrical low pass filter configured to remove harmonics from the first electrical signal;

an inverting electrical amplifier, EA, connected to the first electrical low pass filter and configured to generate a negative polarity, amplified voltage signal from the first electrical signal;

an electro-absorption modulator, EAM, having an optical input configured to receive the 95% of the FSO signal pulses on the second path, and having an electrical input connected to the inverting electrical amplifier to receive the negative polarity, amplified voltage signal, the electro-absorption modulator configured to attenuate the amplitude of the 95% of the FSO signal pulses based on the negative polarity, amplified voltage signal;

a first optical amplifier, $OA_1$, connected to an optical output of the electro-absorption modulator and configured to amplify the attenuated 95% of the FSO signal pulses;

a first optical band pass filter, $OBPF_1$, connected to the first optical amplifier and configured to filter the frequency of the amplified 95% of the FSO signal pulses and generate output FSO signal pulses; and a second transmitter telescope configured to transmit the output FSO signal pulses on a second free space optical (FSO) link; and a second receiver telescope configured to receive the output FSO signal pulses on the second FSO link.

17. The system for optical regeneration of optical communications of claim 16, further comprising:

the first transmitter including:

a continuous wave (CW) laser diode configured to generate an optical power output;

a Mach-Zehnder modulator, MZM, configured to receive the output power output and generate modulated optical pulses;

a second optical amplifier, $OA_2$, connected to the MZM and configured to generate amplified modulated optical pulses;

a second optical band pass filter, $OBPF_2$, configured to filter out-of-band amplified spontaneous emission noise from the amplified modulated optical pulses to generate the FSO signal pulses; and a first transmitter telescope configured to transmit the FSO signal pulses over the first FSO link to the first receiver telescope.

18. The system for optical regeneration of optical communications of claim 17, further comprising:
a first receiver including:
the second receiver telescope;
a second photodetector, $PD_2$, configured to receive the output FSO signal pulses and convert the output FSO signal pulses to a second electrical signal;
a second electrical low pass filter, $ELPF_2$, connected to the second photodetector, the $ELPF_2$ configured to filter the second electrical signal to generate a filtered second electrical signal; and
a bit error rate (BER) analyzer connected to the $ELPF_2$, the BER analyzer configured to calculate a bit error rate of the filtered second electrical signal.

19. The system for optical regeneration of optical communications of claim 18, the electro-absorption modulator further comprising:
a bulk semiconductor waveguide having an intrinsic depletion region between a p-type semiconductor and an n-type semiconductor;
the electrical input connected to the p-type semiconductor;
a ground connected to the n-type semiconductor;
wherein the negative polarity, amplified voltage signal is applied perpendicularly across the intrinsic depletion region with respect to a direction of the 95% of the FSO signal pulses on the second path; and
wherein a bandgap of the intrinsic depletion region is configured to increase or decrease based on an amplitude of the negative polarity, amplified voltage signal, thereby attenuating intensity fluctuations of the 95% of the FSO signal pulses.

20. The system for optical regeneration of optical communications of claim 19, further comprising:
a gain control in the inverting electrical amplifier, EA, wherein the gain control is configured to adjust the amplitude of the negative polarity, amplified voltage signal to suppress variation in intensities of the FSO signal pulses.

* * * * *